(12) United States Patent
Wang et al.

(10) Patent No.: US 6,695,262 B2
(45) Date of Patent: Feb. 24, 2004

(54) SPACECRAFT METHODS AND STRUCTURES FOR ENHANCED SERVICE-ATTITUDE ACCURACY

(75) Inventors: Grant Wang, Hacienda Heights, CA (US); Richard Fowell, Rolling Hills Estates, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/013,137

(22) Filed: Dec. 7, 2001

(65) Prior Publication Data

US 2003/0106966 A1 Jun. 12, 2003

(51) Int. Cl.[7] .................................................. B64G 1/24
(52) U.S. Cl. .................. 244/164; 244/158 R; 455/427; 342/354; 342/357.02
(58) Field of Search .......................... 244/158 R, 164; 342/352, 354, 355, 357.11, 357.02; 701/1, 13, 226, 205; 455/427, 430

(56) References Cited

U.S. PATENT DOCUMENTS

| | | | |
|---|---|---|---|
| 4,883,244 | A | 11/1989 | Challoner et al. |
| 5,175,556 | A | 12/1992 | Berkowitz |
| 5,184,790 | A | 2/1993 | Fowell ........................ 244/165 |
| 5,587,714 | A | 12/1996 | Chu et al. |
| 5,717,404 | A | * 2/1998 | Malla ...................... 342/357.02 |
| 5,790,071 | A | 8/1998 | Silverstein et al. .......... 342/354 |
| 5,926,130 | A | 7/1999 | Werntz ........................ 342/354 |
| 6,135,389 | A | 10/2000 | Fowell |
| 6,163,296 | A | 12/2000 | Lier et al. |
| 6,283,415 | B1 | * 9/2001 | Rosen ......................... 244/164 |
| 6,288,671 | B1 | * 9/2001 | Wu et al. ................. 342/357.11 |
| 6,389,336 | B2 | * 5/2002 | Cellier .......................... 701/13 |
| 6,441,776 | B1 | * 8/2002 | Hein et al. .............. 342/357.06 |
| 6,504,502 | B1 | * 1/2003 | Wu et al. .................... 342/354 |

OTHER PUBLICATIONS

Phase Optimized Beam Design for Direction Sensing Aboard Comunication Satellites, Gregory M. Kautz, General Electric—Corporate Research & Development.

An On–Board Integrated Beam Conditioning System for Active Phased Array Satellite Antennas, Erik Lier, Daniel Purdy, Jeff Ashe, Greg Kautz, Lockheed Martin Commercial Satellite Systems, Newtown, PA, GE Corporate Research and Development Center, Schenectady, NY.

Tripulse: A System for Determining Orientation and Attitude of a Satellite Borne Active Phased Array, Seth D. Silverstein, Jeffrey M. Ashe, Gregory M. Kautz, Frederick W. Wheeler, Anthony Jacomb–Hood.

(List continued on next page.)

*Primary Examiner*—Michael J. Carone
*Assistant Examiner*—Gabriel S. Sukman
(74) *Attorney, Agent, or Firm*—Koppel, Jacobs, Patrick & Heybl

(57) ABSTRACT

Methods and structures are provided that enhance the accuracy of the service attitude of an inclined-orbit spacecraft and, thereby, facilitate reduction of service error between a communication service area and the spacecraft's payload beam. The enhancement is realized by configuring a beacon-receiving antenna to have a beacon-receiving field-of-view that substantially matches a beacon-station window. Preferably, the beacon-receiving field-of-view is elongated and tilted to enhance its match with the beacon-station window in both size and orientation. The goals are also realized by configuring the beacon-receiving antenna to have a beacon-receiving field-of-view that is substantially smaller than the beacon-station window and successively steering a beacon-receiving boresight to successive beacon-receiving attitudes that maintain the beacon station within the beacon-receiving field-of-view over each solar day. In an embodiment of the invention, successive positions of the beacon-receiving field-of-view are arranged in a tiled arrangement. Spacecraft structures are also provided to practice the methods of the invention.

16 Claims, 5 Drawing Sheets

OTHER PUBLICATIONS

Tripulse: An Accurate Orientation/Attitude Estimation System for Satellite Borne Phased Arrays, Seth D. Silverstein, Jeffrey M. Ashe, Gregory M. Kautz, and Frederick W. Wheeler, GE Corporate Research and Development, Schenectady, NY.

Thuraya Mobile System, *Geo–Mobile System Summary*, Hughes Space and Communications Company, pp. 4–4– and 4–5 and Figure 4–20 (Hughes Proprietary Information).

Gregory M. Kautz, General Electric—Corporate Research & Development, *Phase Optimized Beam Design for Direction Sensing Aboard Communication Satellites*, 0–7803–6345–0/00/© 2000 IEEE,pp 185–186, 137, 188.

Erik Lier, Daniel Purdy, Jeff Ashe, Greg Kautz, Lockheed Martin Commercial Satellite Systems, Newtown, PA, GE Corporate Research and Development Center, Schenectady, NY *An On–Board Integrated Beam Conditioning System for Active Phased Array Sateliite Antennas*, 0–7803–6345–0/0/00/© 2000 IEEE.

Seth D. Silverstein, Jeffrey M. Ashe, Gregory M. Kautz, Frederick W. Wheeler, GE Corporate Research and Development, Anthony Jacomb–Hood, Lockheed Martin CPC *Tripluse: A System for Determining Orientation and Attitude of a Satellite Borne Active Phased Array*, 0018–9251/02/© 2002 IEEE, IEEE Transactions on Aerospace and Electronic Systems, vol. 38, No. 1, Jan. 2002, PP 1–12.

Seth D. Silverstein, Jeffrey M. Ashe, Gregory M. Kautz, and Frederick W. Sheeler, GE Corporate Research and Development, Schenectady, New York 12301 USA, *Tripulse: An Accurate Orientation/Attitude Estimation System For Satellite Borne Phased Arrays*, 0–7803–4428–6/98 ©1998 IEEE, pp 1921–1924.

Thuraya Mobile System, Geo–Mobile System Summary, Hughes Space and Communications Company, pp. 4–4 and 4–5 and Figure 4–20 (Hughes Proprietary Information).

\* cited by examiner

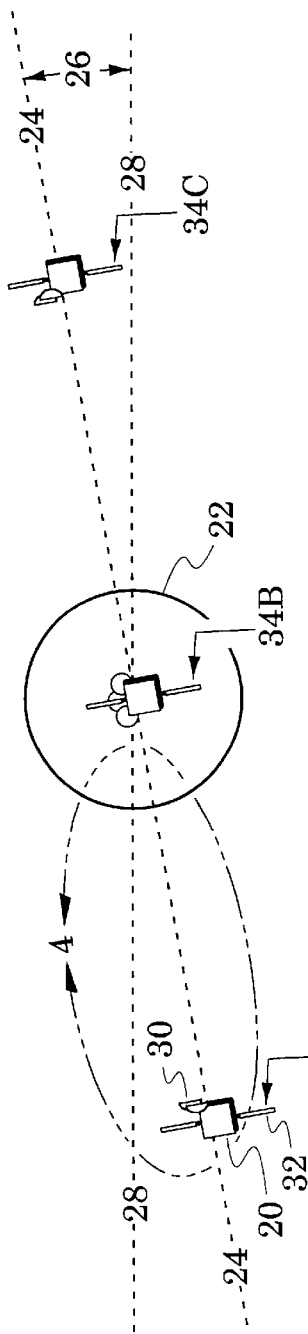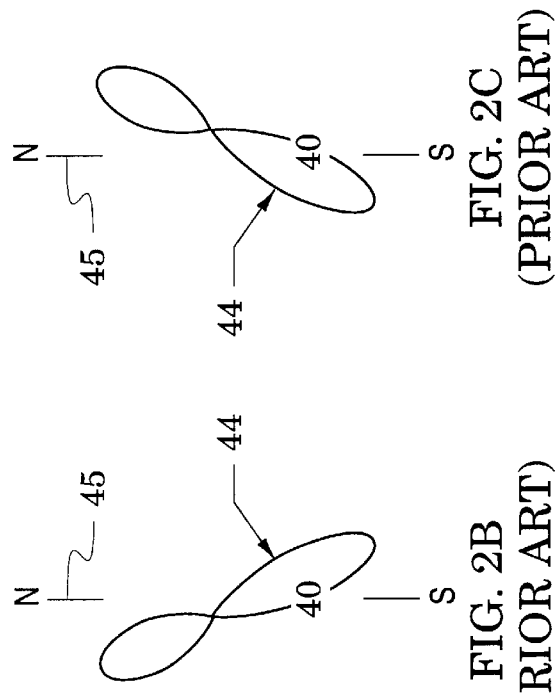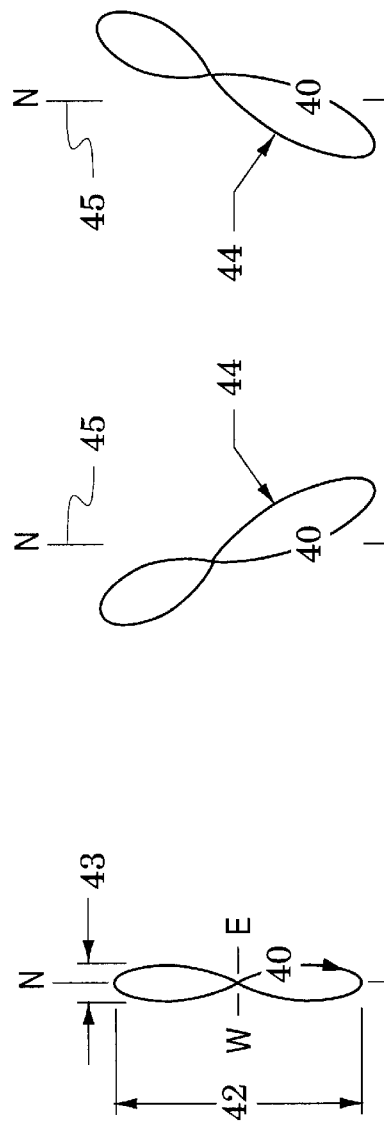

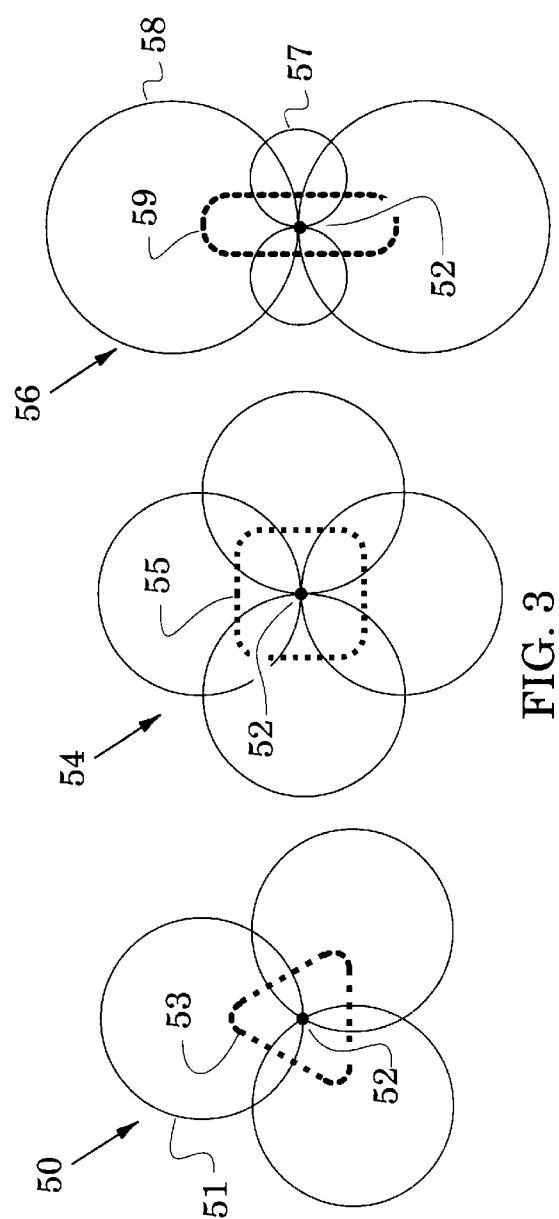
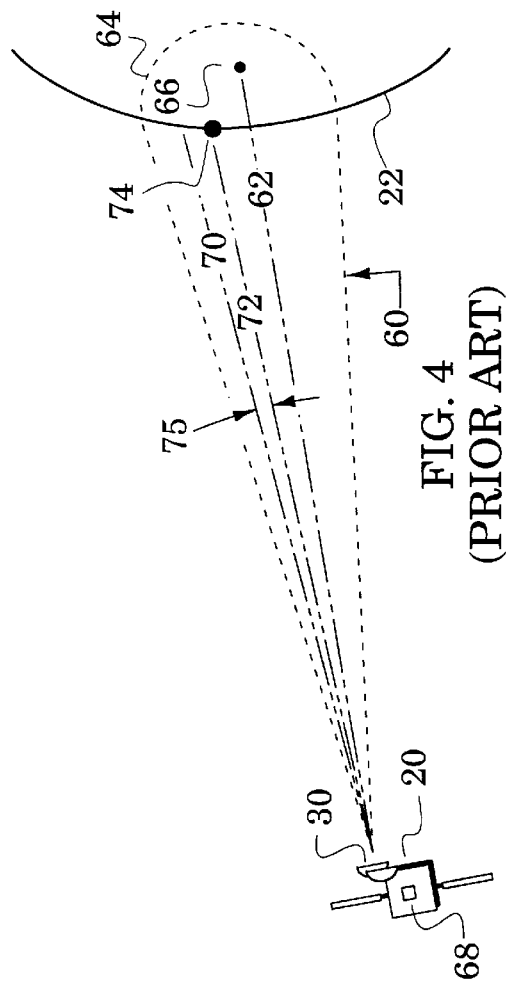
FIG. 3
(PRIOR ART)
FIG. 4
(PRIOR ART)

SPACECRAFT METHODS AND STRUCTURES FOR ENHANCED SERVICE-ATTITUDE ACCURACY

BACKGROUND OF THE INVENTION

1. Field of the Invention

The present invention relates generally to spacecraft and, more particularly, to spacecraft attitude determination and control.

2. Description of the Related Art

Points on the earth do not move relative to a geostationary spacecraft. Accordingly, the spacecraft can be maintained in an appropriate service attitude and the positions of earth points, relative to that attitude, will remain constant over each solar day. An exemplary geostationary spacecraft is a communication spacecraft that provides a payload beam which serves a communication service area on the earth and facilitates communication between points in the communication service area and the spacecraft.

In particular, the payload beam is configured to define a payload footprint on the earth that is preferably identical to the communication service area. Because earth points remain fixed relative to the service attitude of a geostationary spacecraft, the payload footprint remains substantially fixed over each solar day. This characteristic of geostationary spacecraft facilitates minimization of service error which is any difference between the payload footprint and the service area.

In contrast to a geostationary spacecraft, FIG. 1 illustrates a communication spacecraft 20 that orbits the earth 22 in an orbit whose orbital plane 24 is inclined by an inclination angle 26 from the earth's equatorial plane 28. The spacecraft carries an antenna system 30 and solar wings 32 and is shown in its service attitude at positions 34A, 34B and 34C which correspond to times $T_O$, $T_O+6$ hours and $T_O+12$ hours. The spacecraft may use signals from a beacon station on the earth 22 as an attitude reference.

Because the spacecraft 20 of FIG. 1 is in an inclined orbit, earth points will move relative to the spacecraft's service attitude. In particular, they move along a figure-eight path such as the path 40 of FIG. 2A which indicates movement direction by a path arrowhead. Earth points initially drift southward and eastward during the first quarter of the orbit from its ascending node (spacecraft at position 34B in FIG. 1). For example, an inclination (26 in FIG. 1) of 5.4 degrees will cause an earth point (e.g., a beacon station) at approximately 25° north latitude to trace a path having a north-south angular extent 42 on the order of 0.72 degrees and an east-west angular extent 43 on the order of 0.14 degrees.

More generally, the path 40 will define distorted figure-eight patterns that are tilted from a north-south axis 45 as shown in FIGS. 2B and 2C. The path 40 and the area within the path can be considered to define a beacon-station window 44 (i.e., a window, as observed from the spacecraft, that always contains the beacon station).

Various optimal steering laws have been utilized to realize different spacecraft pointing objectives (e.g., see U.S. Pat. Nos. 5,184,790, 5,738,309 and 6,135,389). A spacecraft's service attitude is determined by its respective steering law and the motion of an earth point, relative to the spacecraft, is a function of the steering law, orbital eccentricity, spacecraft mean longitude error, orbit inclination and longitude/latitude of the earth point relative to the spacecraft's location.

The service attitude of a communication spacecraft is typically maintained with an attitude-control system that receives attitude input signals from various attitude sensors. An exemplary set of attitude sensors comprises a sun sensor and a beacon-receiving antenna that receives a beacon signal from a beacon station on the earth. The beacon-receiving antenna is typically realized with several similar antenna beams that are arranged in a pattern such as the three-beam pattern 50 of FIG. 3.

In this pattern, the beam widths of the three beams are represented by similar circles 51 which define beam points that have a common power level and are arranged to intersect at a beacon-receiving boresight 52. Other exemplary beacon-receiving beam patterns in FIG. 3 are the four-beam pattern 54 and the four-beam pattern 56 which also define beacon-receiving boresights 52. Because each beam's power slope increases off-peak, the beam patterns of FIG. 3 form sensitive beacon-receiving antennas.

The field-of-view of a beacon-receiving antenna is defined as the area over which it provides a useful attitude signal and is substantially determined by signal-to-noise considerations. The three-beam pattern 50 forms a substantially-triangular field-of-view 53 and the four-beam pattern 54 forms a substantially square field-of-view 55. The four-beam pattern 56 includes a first pair of beams 57 that are alternated with a second pair of antenna beams 58. Because each of the second pair has a beam width that is substantially broader than that of each of the first pair, the four-beam pattern 56 forms an elongate field-of-view 59. Typically, the fields-of-view of beacon-receiving antennas (e.g., 53, 55 and 59 in FIG. 3) have been enlarged to a size that insures they will contain the beacon-station window (e.g., 44 in FIGS. 2B and 2C) throughout a communication spacecraft's orbit.

FIG. 4 is a view of elements within the curved line 4 of FIG. 1. FIG. 4 illustrates that the antenna system 30 generates a payload beam 60 that has a payload vector such as the payload-beam boresight 62 fixed in the payload beam. The payload beam illuminates a payload footprint 64 on the earth 22 that is preferably identical to a communication service area. It has been found that the service error (between the footprint and the communication service area) is reduced if the payload vector is directed over each solar day at a subterranean target 66 as taught, for example, in U.S. Pat. No. 6,135,389.

The spacecraft 20 has two attitude sensors in the form of a sun sensor 68 and a beacon-receiving antenna that is realized with the antenna system 30. The sun sensor 68 is preferably one having a wide field-of-view (e.g., 120°) that can provide an attitude signal for a significant portion (e.g., 4–6 hours) of each solar day. The spacecraft's attitude control system preferably includes a gyroscope system that estimates attitude about the yaw axis for the remaining portions of the day. With attitude input signals from the sun sensor and the gyroscope system, the spacecraft's attitude control system is able to control the spacecraft's attitude about its yaw axis which is generally coaxial with the payload-beam boresight 62.

The beacon-receiving antenna (part of the system 30) has a beacon-receiving boresight 70 which generally differs from a beacon line-of-sight 72 from the spacecraft 20 to a beacon station 74 which radiates a beacon signal. The beacon-receiving antenna provides a difference signal which corresponds to the difference angle 75 between the beacon-receiving boresight 70 and the beacon line-of-sight 72. The difference signal is a useful attitude signal over the beacon-receiving antenna's field-of-view (e.g., 59 in FIG. 3). With the difference signal and yaw information from the sun sensor and gyroscope system, the spacecraft's attitude-control system is programmed to direct the payload-beam boresight 62 at the target 66 over each solar day.

The payload beam is typically formed with a plurality of spot beams (e.g., on the order of 200). Reduction of service error has typically been realized by uploading beam coefficients and beam weights throughout the solar day that appropriately steer and reshape the spot beams. The specifications of many modern communication systems, however, are quite demanding and these systems have generally observed that the service error remains excessive and further reduction of service error would be useful.

BRIEF SUMMARY OF THE INVENTION

The present invention is directed to methods and structures that enhance service attitude accuracy of inclined-orbit spacecraft and, thereby, facilitate reduction of service error between a communication service area and a spacecraft's payload beam.

These goals are realized by configuring a beacon-receiving antenna to have a beacon-receiving field-of-view that substantially matches a beacon-station window (a window, as observed from the spacecraft, that always contains a beacon station). Preferably, the beacon-receiving field-of-view is elongated and tilted to enhance its match with the beacon-station window in both size and orientation.

The goals are also realized by configuring the beacon-receiving antenna to have a beacon-receiving field-of-view that is substantially smaller than the beacon-station window and successively steering a beacon-receiving boresight to successive beacon-receiving attitudes that maintain the beacon station within the beacon-receiving field-of-view over each solar day. In an embodiment of the invention, successive positions of the beacon-receiving field-of-view are arranged in a tiled arrangement.

Spacecraft structures are also provided to practice the methods of the invention.

The novel features of the invention are set forth with particularity in the appended claims. The invention will be best understood from the following description when read in conjunction with the accompanying drawings.

BRIEF DESCRIPTION OF THE DRAWINGS

FIG. 1 is a diagram that illustrates a spacecraft in an inclined orbit about the earth wherein the spacecraft is shown in a service attitude at times $T_O$, $T_O+6$ hours and $T_O+12$ hours;

FIG. 2A illustrates a path along which the beacon station of FIG. 1 moves relative to the service attitude of the spacecraft of FIG. 1;

FIGS. 2B and 2C illustrate more general beacon-station paths;

FIG. 3 is a diagram that illustrates three-beam and four-beam patterns of conventional beacon-receiving antennas;

FIG. 4 is an enlarged view of elements within the curved line 4 of FIG. 1 which illustrates a line-of-sight to a beacon station, a boresight of a beacon-receiving antenna on the spacecraft of FIG. 1 and a difference angle between them;

DETAILED DESCRIPTION OF THE INVENTION

The present invention recognizes that the beacon-receiving field-of-view can be a significant source of service error. This field-of-view must be sufficient to insure that a difference signal is provided throughout each solar day to the attitude control system of a spacecraft so that this system can always maintain the spacecraft's service attitude. The field-of-view 59 of FIG. 3, for example, must be sufficiently enlarged to to insure that it always encompasses the beacon-station window 44 in FIGS. 2B–2C. Such an enlarged field-of-view generates a reduced difference-angle sensitivity and the consequence is degraded service attitude and increased service error.

The invention further recognizes that smaller fields-of-view imply smaller beacon beams which have sharper phase and gain slopes that can realize greater measurement sensitivities. That is, the smaller the beam size and the smaller the corresponding field-of-view, the greater the sensitivity and measurement accuracy. Smaller fields-of-view also reduce the measurement nonlinearity. By forming a reduced beacon-receiving field-of-view, therefore, the invention significantly increases the beacon sensor's accuracy.

In the invention, a preferred beacon-receiving field-of-view is configured to substantially match the beacon-station window 44, i.e., matches the beacon-station window 44 in both size and orientation. Such a field-of-view provides significantly greater difference-angle sensitivity across the beacon-station window 44 than do larger fields-of-view that have been conventionally used.

Figure 5:
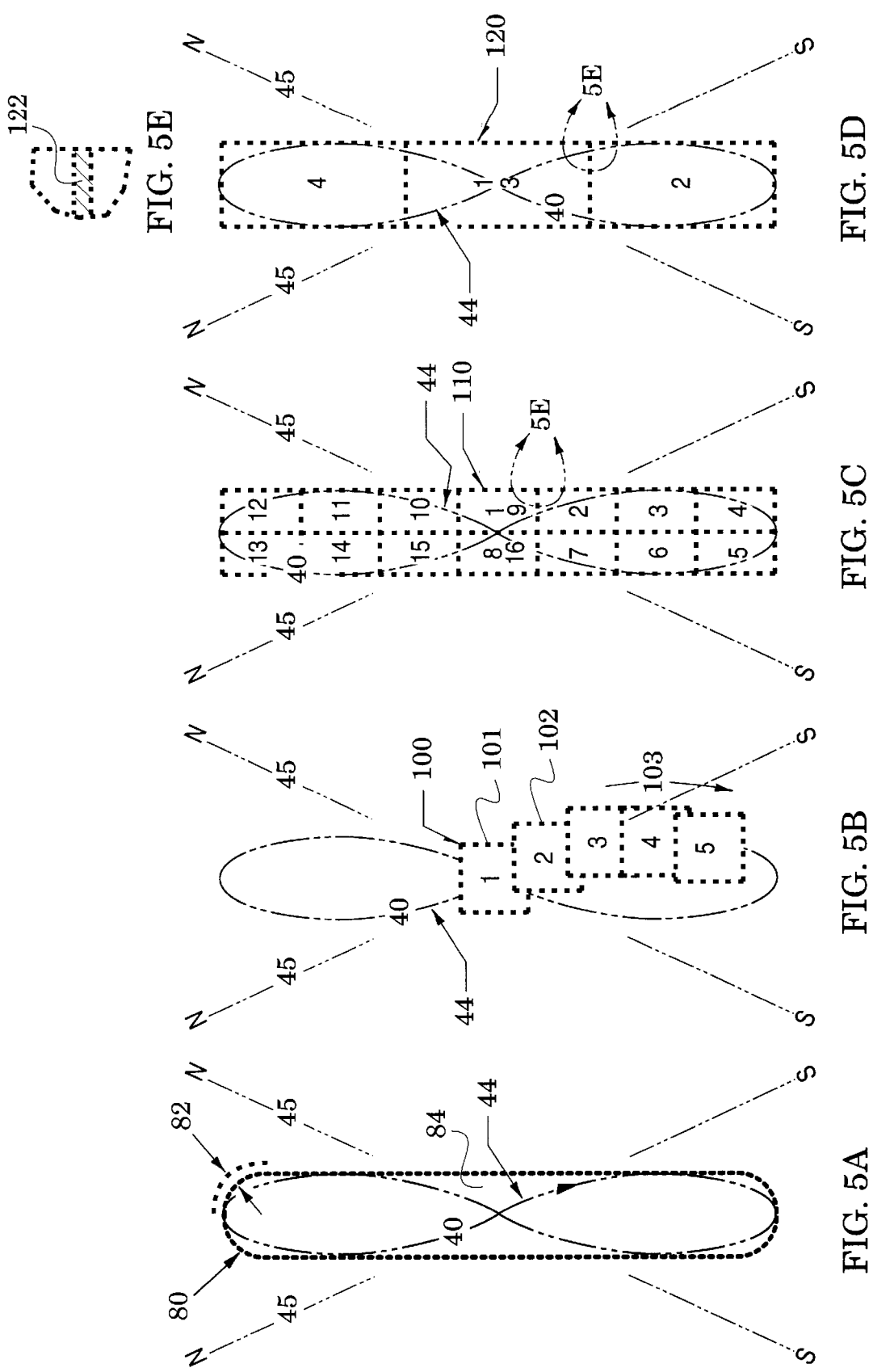
FIGS. 5A–5E are diagrams that illustrate beacon-receiving fields-of-view of the invention which reduce service error.

FIG. 5A illustrates an enlarged version of the path 40 of FIG. 2A and the beacon-station window 44 defined by that path. As shown in FIGS. 2B–2C, the beacon-station window 44 is generally tilted from a north-south axes 45. For clarity of illustration, FIG. 5A rotates the beacon-station window 44 to an upright position and shows the north-south axis 45 in two alternate positions which are now tilted oppositely from the upright position.

As shown in FIG. 5A, the invention configures a spacecraft's beacon-receiving antenna to have an elongate beacon-receiving field-of-view 80 that substantially matches the beacon-station window 44 in size and orientation. Preferably, the elongate field-of-view 80 would be somewhat enlarged by an error margin 82 to accommodate antenna pointing errors and also departs from convex portions (e.g., in regions 84) of the beacon-station window to facilitate practical realization of the field-of-view. As shown, the elongate beacon-receiving field-of-view 80 is preferably tilted (from a relevant one of the north-south axes 45) to enhance its match with the beacon-station window 44.

Figure 6:
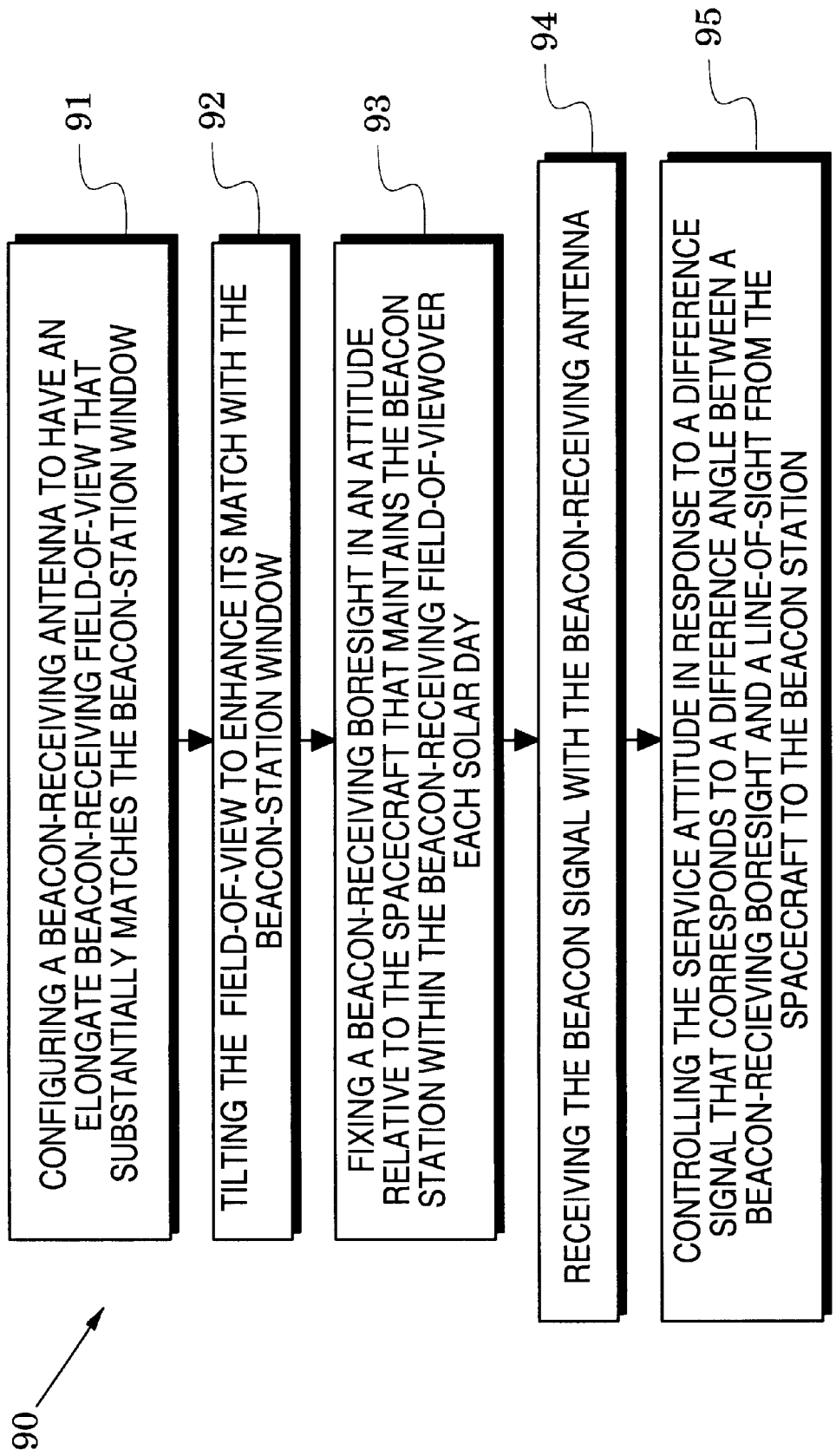
FIG. 6 is a flow chart that illustrates method embodiments of the invention for reducing service error.

The flow chart 90 of FIG. 6 illustrates process steps that correspond to the beacon-receiving field-of-view 80 of FIG. 5A and form a method of enhancing the accuracy of a spacecraft's service attitude. The method is preferably practiced with a beacon-receiving antenna that has a beacon-receiving boresight (70 in FIG. 4) and that generates a difference signal which corresponds to a difference angle (75 in FIG. 4) between the beacon-receiving boresight and a line-of-sight (72 in FIG. 4) from the spacecraft to the beacon station (74 in FIG. 4).

In a first process step 91, a beacon-receiving antenna is configured to have a beacon-receiving field-of-view (80 in FIG. 5A) that substantially matches the beacon-station window (44 in FIG. 5A). Preferably, the beacon-receiving field-of-view is elongated and tilted, as in process step 92, to enhance its match with the beacon-station window. In process step 93, the beacon-receiving boresight is fixed in an attitude relative to the spacecraft that maintains the beacon station within the beacon-receiving field-of-view over each solar day.

The beacon signal is then received with the beacon-receiving antenna in process step 94 and, in process step 95, the service attitude is controlled in response to the difference signal. The service-attitude accuracy is substantially enhanced because the beacon-receiving field-of-view substantially matches the beacon-station window.

FIG. 5B is similar to FIG. 5A with like elements indicated by like reference numbers. In contrast, however, it illustrates a beacon-receiving field-of-view 100 that is is substantially smaller than the beacon-station window 44 and that is successively moved along the path 40 (as indicated by exemplary sequence numbers 1–5) to locations 101, 102 and so on. For example, the field-of-view 100 is placed in location 101 during the time the spacecraft is in the region of its orbit's ascending node.

When the beacon station subsequently approaches an edge of the field-of-view 100, the field-of-view is shifted to location 102 and this movement pattern is repeated during the solar day to keep the beacon station within the beacon-receiving field-of-view. The shifting of the field-of-view 100 is generally aligned along a tilted orientation to thus enhance its match with the tilted beacon-station window 44.

The general processes of FIG. 5B can be practiced in a large variety of detailed method embodiments. In FIG. 5C, for example, the beacon-station window 44 is essentially partitioned into segments which represent successive positions of a beacon-receiving field-of-view 110. The beacon-receiving field-of-view is significantly smaller than the beacon-station window 44 (e.g., by an order of magnitude) and is successively steered to beacon-receiving attitudes (as indicated by sequence numbers 1–16) that maintain the beacon station within the beacon-receiving field-of-view over each solar day. When all of the segment positions are shown at one time as in FIG. 5C, they may be generally arranged in a tiled arrangement that covers the beacon-station window 44.

For orbits that have a small inclination, the east-west extent of the path 40 of FIG. 5C is quite small. In such orbits, it may be preferable to partition the beacon-station window 44 into a smaller number of successive segments (e.g., segments that are less than ½ the window) which represent successive positions of a beacon-receiving field-of-view 120. This arrangement is exemplified in FIG. 5D where there are only three segments. Beginning at the orbit's ascending node, the beacon-receiving boresight is steered as indicated by sequence numbers 1–4 after which the sequence begins again. Similar to FIG. 5C, the segment positions are generally arranged in a tiled arrangement that covers the beacon-station window 44.

In more detail, the segments of FIGS. 5C and 5D are preferably arranged to overlap as shown in FIG. 5E which is an enlarged view of the area within the curved line 5E of FIGS. 5C and 5D. In particular, the overlap defines an overlap region 122 which facilitates the transfer of the beacon-receiving field-of-view between neighboring segments because the beacon station can be received from either of neighboring segments when it is in the overlap region.

FIG. 5B indicates that the beacon-receiving field-of-view is successively moved in discrete angular increments and FIGS. 5C and 5D indicate that the number of angular increments in each solar day can be limited (e.g., to 3 or to 10). In other embodiments of the invention, the beacon-receiving boresight may be continuously steered so that the beacon-receiving field-of-view is continuously moving. Although the beacon-receiving field-of-view of FIGS. 5B–5C is shown to always be of the same size, the size may vary in other embodiments so long as it is always less than the beacon-station window 44.

Figure 7:
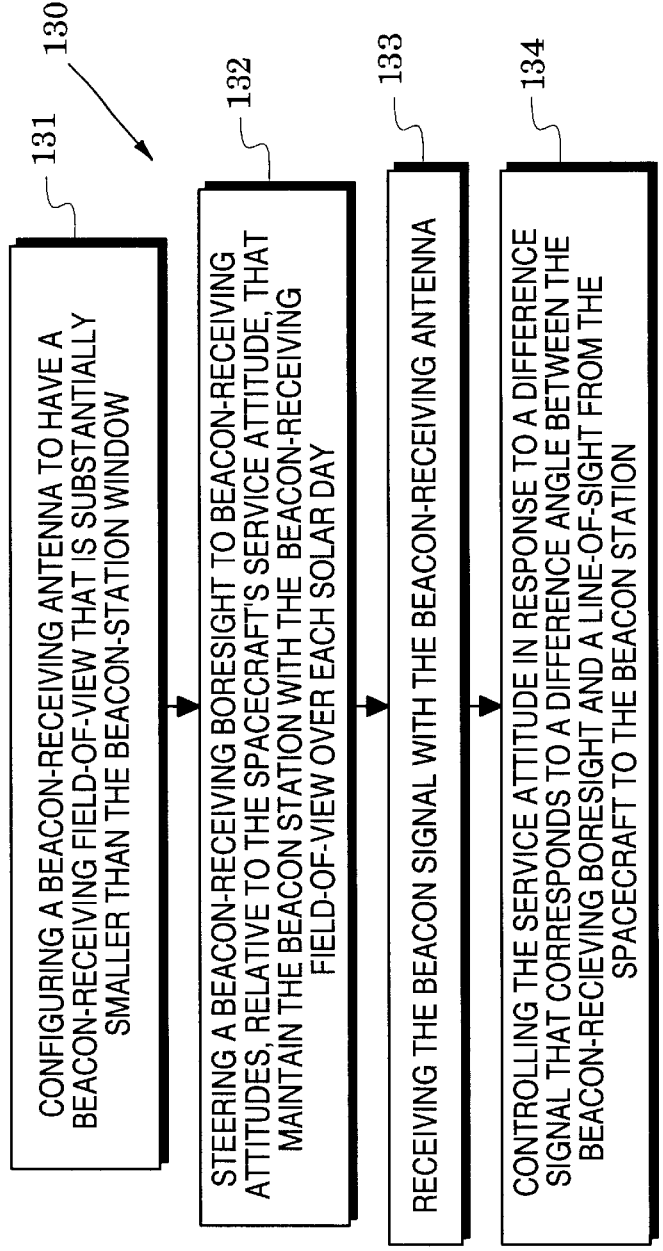
FIG. 7 is another flow chart that illustrates method embodiments of the invention for reducing service error.

The flow chart 130 of FIG. 7 illustrates process steps that correspond to beacon-receiving fields-of-view 100, 110 and 120 of FIGS. 5B–5D and form another method of enhancing the accuracy of a spacecraft's service attitude. The method is preferably practiced with a beacon-receiving antenna that has a beacon-receiving boresight (70 in FIG. 4) and that generates a difference signal which corresponds to a difference angle (75 in FIG. 4) between the beacon-receiving boresight and a line-of-sight (72 in FIG. 4) from the spacecraft to the beacon station (74 in FIG. 4).

In a first process step 131, a beacon-receiving antenna is configured to have a beacon-receiving field-of-view (e.g., 100 in FIG. 5B) that is substantially smaller than the beacon-station window (44 in FIG. 5B). The beacon-receiving boresight is then successively steered (e.g. as in FIG. 5B) in process step 132 to beacon-receiving attitudes, relative to the service attitude, that maintain the beacon station (74 in FIG. 4) within the beacon-receiving field-of-view over the solar day.

The beacon signal is then received with the beacon-receiving antenna in process step 133 and, in process step 134, the service attitude is controlled in response to the difference signal. The service-attitude accuracy is enhanced because the beacon-receiving field-of-view is substantially smaller than the beacon-station window. In an embodiment of the method, successive positions of the beacon-receiving field-of-view are arranged in a tiled arrangement (e.g., as shown in FIGS. 5C–5D).

When practicing the method of FIG. 7, the beacon-receiving boresight (70 in FIG. 4) is successively moved to attitudes, relative to the spacecraft's service attitude, that maintain the beacon station (74 in FIG. 4) within the smaller beacon-receiving field-of-view (e.g., 100 in FIG. 5B) over each solar day. The service attitude is then controlled with reference to the difference signal which corresponds to the difference angle (75 in FIG. 4) between a measured beacon line-of-sight and the beacon-receiving boresight.

In particular, a desired beacon station line-of-sight may be established from ephemeris that will maintain the service area within the beacon-receiving field-of-view. Because the measured beacon station line-of-sight is the sum of the difference angle and the beacon-receiving boresight, the boresight can be steered to reduce any error between desired beacon station line-of-sight and the measured beacon station line-of-sight.

Figure 8:
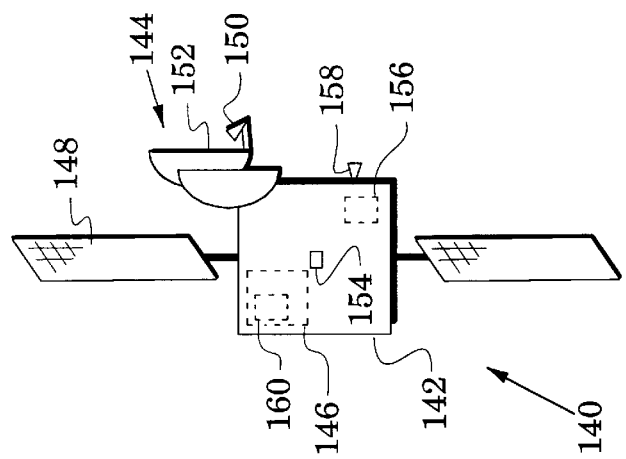
FIG. 8 is a diagram of a spacecraft for practicing the methods of the invention.

FIG. 8 illustrates a spacecraft 140 for practicing the methods of the invention. The spacecraft has a body 142 that carries an antenna system 144, an attitude-control system 146 and solar panels 148 that provide power for the spacecraft. The antenna system 144 preferably comprises an array of antenna elements (e.g., horns 150 and associated reflectors 152) that can generate a payload beam (e.g., 60 in FIG. 4), a beacon-receiving boresight (e.g., 70 in FIG. 4) and a beacon-receiving field-of-view (e.g., 100 in FIG. 5B).

The attitude control system is provided with attitude sensors such as a sun sensor 154 and a beacon-receiving antenna that is formed by the antenna system 144. The attitude control system is also provided at least one torque generator such as a momentum wheel 156 or a thruster 158 that can generate torques in the body 142 to thereby change its attitude. The attitude control system preferably includes a data processor 160 that is programmed in accordance with the methods of the invention (e.g., the process steps of FIGS. 6 and 7).

The payload beam (60 in FIG. 4) may be steered (e.g., with aid of the processor 160) throughout each solar day to reduce service error and this may be effected by uploading beam coefficients and beam weights at selected times of the solar day. Ephemeris data that determines the desired beacon-receiving fields-of-view and boresights may be effectively included in these uploads.

It is well known that antennas operate in accordance with the reciprocity theorem which states that the transmitting and receiving patterns of an antenna are the same. Accordingly, it is intended that antenna-related terms of the invention (e.g., payload beam, spot beams and beacon-receiving antenna patterns) are not restricted but may apply to transmitting or receiving functions as determined by the context in which they appear.

The embodiments of the invention described herein are exemplary and numerous modifications, dimensional variations and rearrangements can be readily envisioned to achieve an equivalent result, all of which are intended to be embraced within the scope of the appended claims.

We claim:

1. A method of enhancing the accuracy of the service attitude of a spacecraft that orbits the earth each solar day wherein an earth-based beacon station radiates a beacon signal and, relative to said spacecraft, moves along a path that defines a beacon-station window, the method comprising the steps of:
   configuring a beacon-receiving antenna to have a beacon-receiving field-of-view that is substantially smaller than said beacon-station window wherein said beacon-receiving antenna has a beacon-receiving boresight and generates a difference signal that corresponds to a difference angle between said beacon-receiving boresight and a line-of-sight from said spacecraft to said beacon station;
   successively steering said beacon-receiving boresight to beacon-receiving attitudes, relative to said service attitude, that maintain said beacon station within said beacon-receiving field-of-view over said solar day;
   receiving said beacon signal with said beacon-receiving antenna; and
   controlling said service attitude in response to said difference signal;
   said accuracy enhanced because said beacon-receiving field-of-view is substantially smaller than said beacon-station window.

2. The method of claim 1, wherein said steering step includes the step of moving said beacon-receiving field-of-view along a generally-tilted path to thereby enhance its match with said beacon-station window.

3. The method of claim 1, wherein said configuring step includes the step of arranging said beacon-receiving field-of-view as a segment of said beacon-station window.

4. The method of claim 1, wherein said configuring step includes the step of arranging said beacon-receiving field-of-view to have an area less than ½ the area of said beacon-station window.

5. The method of claim 1, wherein said configuring step includes the step of arranging said beacon-receiving field-of-view to have an area less than 1/10 the area of said beacon-station window.

6. The method of claim 1, wherein said configuring step includes the step of forming said beacon-receiving antenna with an array of antenna elements.

7. The method of claim 1, wherein said configuring step includes the step of forming said beacon-receiving antenna with a reflector and an associated array of antenna horns.

8. The method of claim 1, wherein said steering step includes the step of arranging successive positions of said beacon-receiving field-of-view in a tiled arrangement.

9. The method of claim 1, wherein said controlling step includes the step of supplementing said difference signal with attitude signals from a second attitude sensor.

10. The method of claim 1, wherein said controlling step includes the steps of:
    determining a desired beacon station line-of-sight from ephemeris data;
    determining a measured beacon station line-of-sight as the sum of said difference angle and said beacon-receiving boresight; and
    pointing said beacon-receiving boresight to reduce the difference between said desired beacon station line-of-sight and said measured beacon station line-of-sight.

11. A spacecraft that enhances the accuracy of the spacecraft's service attitude as it orbits the earth each solar day wherein an earth-based beacon station radiates a beacon signal and, relative to said spacecraft, moves along a path that defines a beacon-station window, the spacecraft comprising:
    a spacecraft body;
    an attitude-control system carried by said body to maintain a service attitude of said body;
    at least one solar panel coupled to said body to provide electrical power to said attitude-control system;
    an antenna system that forms a beacon-receiving antenna which has a beacon-receiving boresight and a beacon-receiving field-of-view that is substantially smaller than said beacon-station window wherein said beacon-receiving antenna generates a difference signal that corresponds to a difference angle between said beacon-receiving boresight and a line-of-sight from said spacecraft to said beacon station; and
    a data processor in said attitude-control system that is programmed to instruct:
    a) said antenna system to successively steer said beacon-receiving boresight to successive beacon-receiving attitudes, relative to said service attitude, that maintain said beacon station within said beacon-receiving field-of-view over said solar day;
    b) said antenna system to receive said beacon signal with said beacon-receiving antenna; and
    c) said attitude-control system to control said service attitude in response to said difference signal; said accuracy enhanced because said beacon-receiving field-of-view is substantially smaller than said beacon-station window.

12. The spacecraft of claim 11, wherein said beacon-receiving antenna is formed by an array of antenna elements.

13. The spacecraft of claim 12, wherein said antenna elements are antenna horns and said beacon-receiving antenna further includes a reflector positioned to reflect a beacon signal to said horns.

14. The spacecraft of claim 11, wherein said antenna system also forms a payload beam and wherein said data processor is programmed to steer said payload beam to substantially match a service area on said earth over each solar day.

15. The spacecraft of claim 11, wherein said data processor is programmed to instruct said attitude-control system to:

determine a desired beacon station line-of-sight from ephemeris data;

determine a measured beacon station line-of-sight as the sum of said difference angle and said beacon-receiving boresight; and point said beacon-receiving boresight to reduce the difference between said desired beacon station line-of-sight and said measured beacon station line-of-sight.

16. The spacecraft of claim 11, wherein said beacon-receiving field-of-view has an area less than ½ the area of said beacon-station window.

\* \* \* \* \*